(12) United States Patent
Luna Olvera et al.

(10) Patent No.: US 9,919,746 B2
(45) Date of Patent: Mar. 20, 2018

(54) ARTICULATING MOTOR VEHICLE FLOOR ASSEMBLY WITH LIFT ASSIST

(71) Applicant: FORD GLOBAL TECHNOLOGIES, LLC, Dearborn, MI (US)

(72) Inventors: Ricardo David Luna Olvera, Mexico City (MX); Adrian Andres Perez Machuca, Azcapotzalco (MX); Shair Mendoza Flores, Delegacion Alvaro Obregon (MX)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 15/238,414

(22) Filed: Aug. 16, 2016

(65) Prior Publication Data

US 2018/0050733 A1    Feb. 22, 2018

(51) Int. Cl.
| | | |
|---|---|---|
| *B62D 43/00* | (2006.01) | |
| *B62D 25/20* | (2006.01) | |
| *B60R 5/00* | (2006.01) | |
| *B62D 43/10* | (2006.01) | |
| *B60R 11/06* | (2006.01) | |

(52) U.S. Cl.
CPC ............... *B62D 25/20* (2013.01); *B60R 5/00* (2013.01); *B62D 43/10* (2013.01); *B60R 11/06* (2013.01); *B62D 43/002* (2013.01)

(58) Field of Classification Search
CPC .......... B62D 25/20; B62D 5/00; B62D 43/10; B62D 11/06; B62D 43/002
See application file for complete search history.

(56) References Cited

U.S. PATENT DOCUMENTS

| | | | |
|---|---|---|---|
| 4,969,793 A | 11/1990 | Pawl | |
| 5,011,214 A * | 4/1991 | Friesen | .................... B60J 7/141 |
| | | | 160/213 |
| 6,290,278 B1 | 9/2001 | Loveland | |
| 7,179,040 B2 * | 2/2007 | Masuda | .................... B60R 5/04 |
| | | | 187/211 |
| 7,946,643 B2 * | 5/2011 | Getschel | ................ B60J 7/1621 |
| | | | 296/100.1 |
| 8,172,295 B2 | 5/2012 | Fischer et al. | |
| 8,720,969 B2 | 5/2014 | Young | |

FOREIGN PATENT DOCUMENTS

| | | |
|---|---|---|
| GB | 2436816 A | 10/2007 |
| JP | 2006176060 A | 7/2006 |
| JP | 4694977 B2 | 6/2011 |
| KR | 20060041528 A | 5/2006 |

OTHER PUBLICATIONS

English Machine Translation for JP2006176060A.
English Machine Translation for JP4694977B2.
English Machine Translation for KR20060041528A.

\* cited by examiner

*Primary Examiner* — Lori L Lyjak
(74) *Attorney, Agent, or Firm* — Vichit Chea; King & Schickli, PLLC

(57) ABSTRACT

A motor vehicle floor assembly includes an articulating floor body having a first panel and a second panel supported by a linkage. The linkage includes a first link connected to the first panel, a second link connected to the second panel and a first pivot connecting the first link to the second link and defining an articulation joint for the articulating floor body.

20 Claims, 5 Drawing Sheets

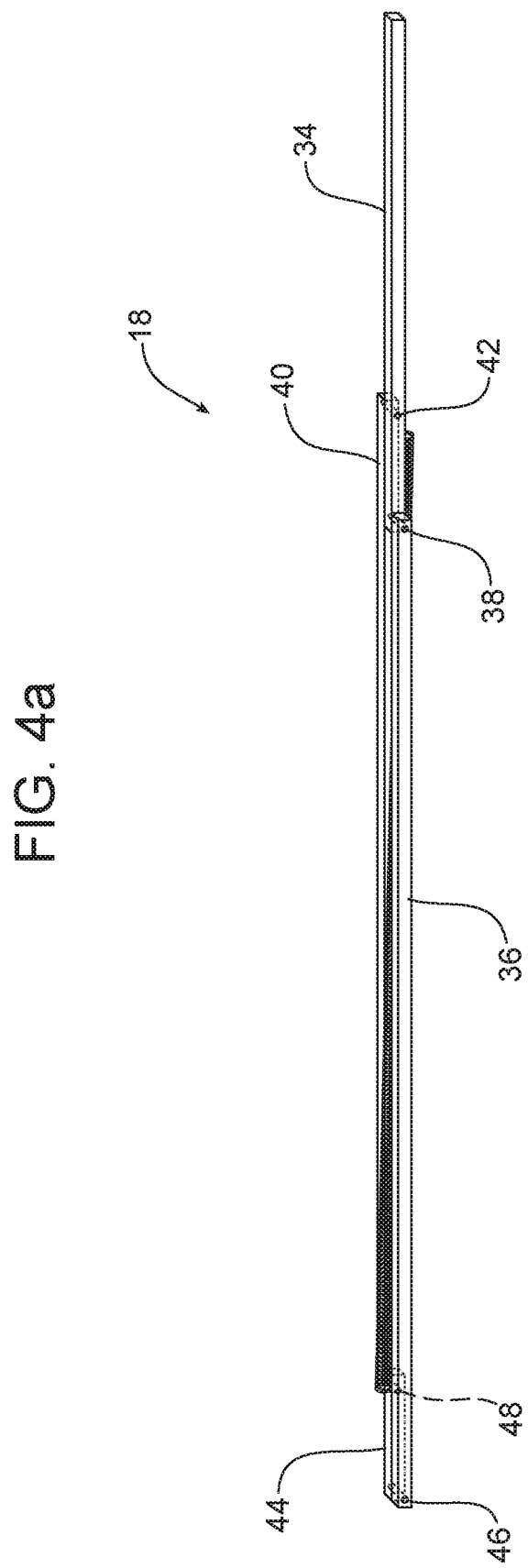

ARTICULATING MOTOR VEHICLE FLOOR ASSEMBLY WITH LIFT ASSIST

TECHNICAL FIELD

This document relates generally to the motor vehicle equipment field and, more particularly, to an articulating motor vehicle floor assembly incorporating a lift assist.

BACKGROUND

Many motor vehicles include a well under the cargo floor that is adapted to hold the spare wheel and tire assembly. One must raise or lift the cargo floor in order to access this well and utilize the spare wheel and tire assembly.

This document relates to an articulating motor vehicle floor assembly that incorporates a lift assist. This allows one to more easily access the spare wheel and tire assembly in a quick, efficient and convenient manner.

SUMMARY

In accordance with the purposes and benefits described herein, an articulating motor vehicle floor assembly is provided. That articulating motor vehicle floor assembly comprises an articulating floor body having a first panel and a second panel supported by a four bar linkage. That articulating floor body is displaceable between a first position and a second position.

A carpet layer may overlie the first panel and the second panel. Further, the motor vehicle floor assembly may include a storage well wherein the articulating floor body conceals the storage well in the first position and allows access to the storage well in the second position.

In accordance with an additional aspect, a motor vehicle floor assembly comprises an articulating floor body having a first panel and a second panel that are supported by a linkage. That linkage includes a first link connected to the first panel, a second link connected to the second panel and a first pivot connecting the first link to the second link and defining an articulation joint for the articulated floor body.

The motor vehicle floor assembly may further include a third link connected to the first link at a second pivot. That second link may be parallel to the third link. In addition, the motor vehicle floor assembly may further include a third pivot connecting the second link to a support structure. Still further, the motor vehicle floor assembly may include a fourth pivot connecting the third link to the support structure.

The motor vehicle floor assembly may also include a latch mechanism releasably securing the articulating floor body in the first position and the second position. That latch mechanism may be magnetic. More specifically, the latch mechanism may include a first magnet to secure the articulating floor body in the first position and a second magnet to secure the articulating floor body in a second position.

In an alternative embodiment the latch mechanism may include a hook and loop fastener.

Still further, the motor vehicle floor assembly may include a spring biasing the articulating floor body toward the second position. That spring may be a linear spring having a first end connected to the first link and a second end connected to the support structure. Advantageously, the spring functions to assist one in lifting the articulating floor body to the second position thereby allowing easier and more convenient access to the storage well and the wheel and tire assembly or other items contained therein.

The motor vehicle floor assembly may further include a bumper stop engaging the articulating floor body in the second position. In addition, the motor vehicle floor assembly may include a dampening strut having a first end connected to the first link and a second end connected to the support structure. In addition, the motor vehicle floor assembly may include a carpet layer covering the first panel, the second panel and a stationary floor panel.

In the following description, there are shown and described several preferred embodiments of the motor vehicle floor assembly. As it should be realized, the motor vehicle floor assembly is capable of other, different embodiments and its several details are capable of modification in various, obvious aspects all without departing from the motor vehicle floor assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the motor vehicle floor assembly and together with the description serve to explain certain principles thereof. In the drawing figures:

FIGS. 4a and 4b are respective detailed perspective views of the supporting linkage illustrated in the first position and the second position.

Figure 1:
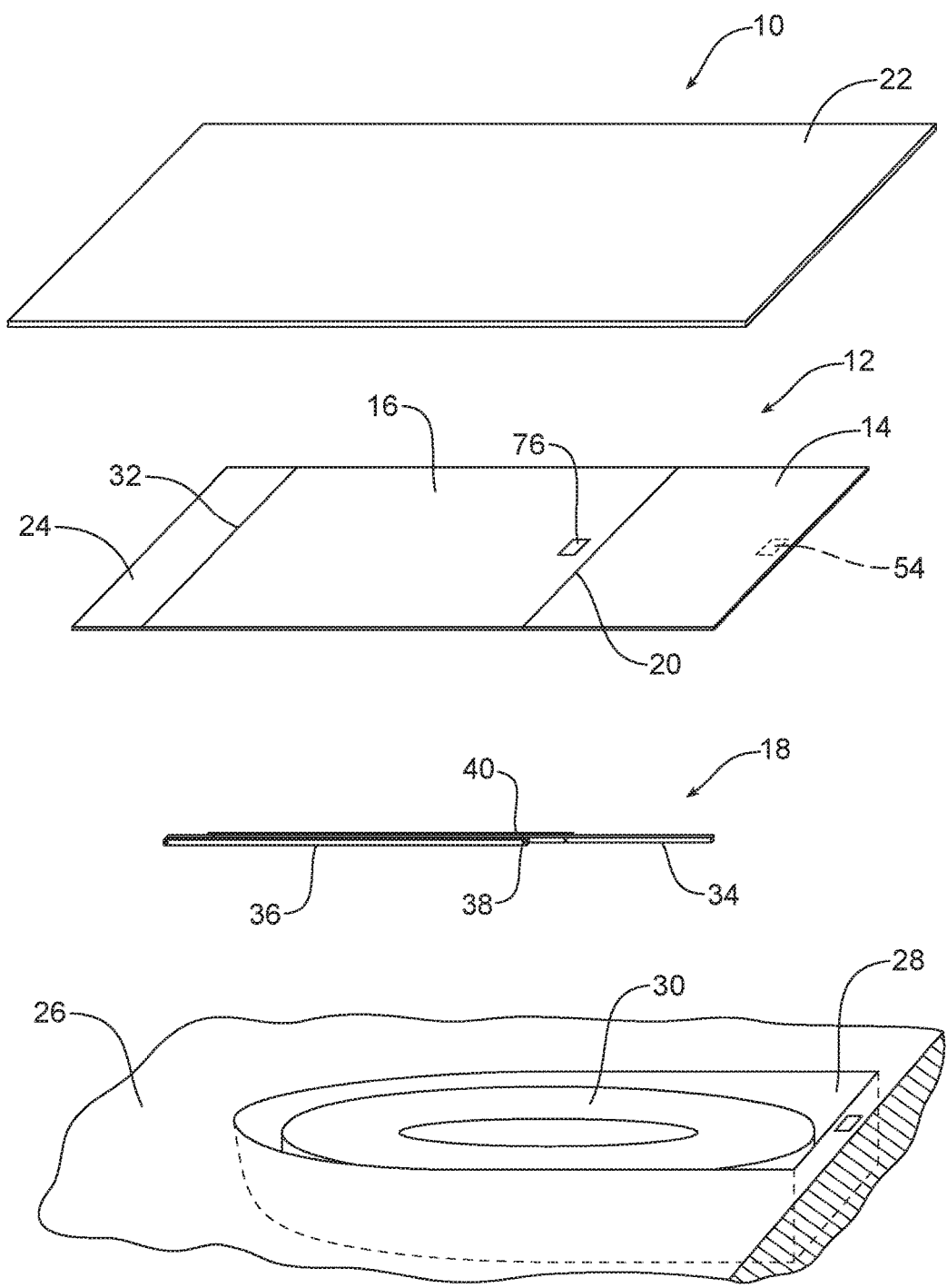
FIG. 1 is an exploded perspective view illustrating one possible embodiment of the motor vehicle floor assembly including the articulating floor body and supporting linkage.

Reference will now be made in detail to one possible embodiment of the motor vehicle floor assembly illustrated in the accompanying drawing figures.

DETAILED DESCRIPTION

Reference is now made to FIGS. 1-4b illustrating the motor vehicle floor assembly 10. That motor vehicle floor assembly 10 includes an articulating floor body 12 having a first panel 14 and a second panel 16 supported by a four bar linkage 18. The first panel 14 and the second panel 16 may be separated by a score line 20. An uninterrupted carpet layer 22 overlies the first panel 14 and second panel 16 connecting them together and effectively functioning as a living hinge at the score line 20. In one possible embodiment, the carpet layer 22 is connected to the first panel 14 and the second panel 16 by means of an appropriate adhesive.

In the illustrated embodiment, the motor vehicle floor assembly 10 also includes a third or stationary floor panel 24 secured to the underlying support structure 26. That support structure 26 may comprise sheet metal body work including a storage well 28 for holding a spare wheel and tire 30 as well as a jack, tire iron and other tools (not shown). A second score line 32 may be provided between the second panel 16 and the third or stationary floor panel 24. The carpet layer 22 may extend continuously across all three panels 14, 16, 24 thereby forming a second living hinge at the second score line 32.

The four bar linkage 18 includes a first link 34 which is connected to and functions as a reinforcing rib for the first panel 14. The four bar linkage 18 also includes a second link 36 which is connected to and functions as a reinforcing rib for the second panel 16. A first pivot 38 such as a pivot pin, connects the first link 34 with the second link 36 at the score line 20 thereby defining an articulation joint for the articulating floor body 12.

The four bar linkage 18 also includes a third link 40 connected to the first link 34 at a second pivot 42 such as a pivot pin. As should be appreciated from viewing FIGS. 1-4b, the second link 36 and the third link 40 are parallel. In the illustrated embodiment, a fourth link 44 is provided as an integral part of the support structure 26. A third pivot 46 connects the second link 36 to the fourth link 44 of the support structure 26. A fourth pivot 48 connects the third link 40 to the fourth link 44 of the support structure 26. FIGS. 4a and 4b provide clear illustrations of the linkage 18 in the respective first position and the second position.

Figure 2:
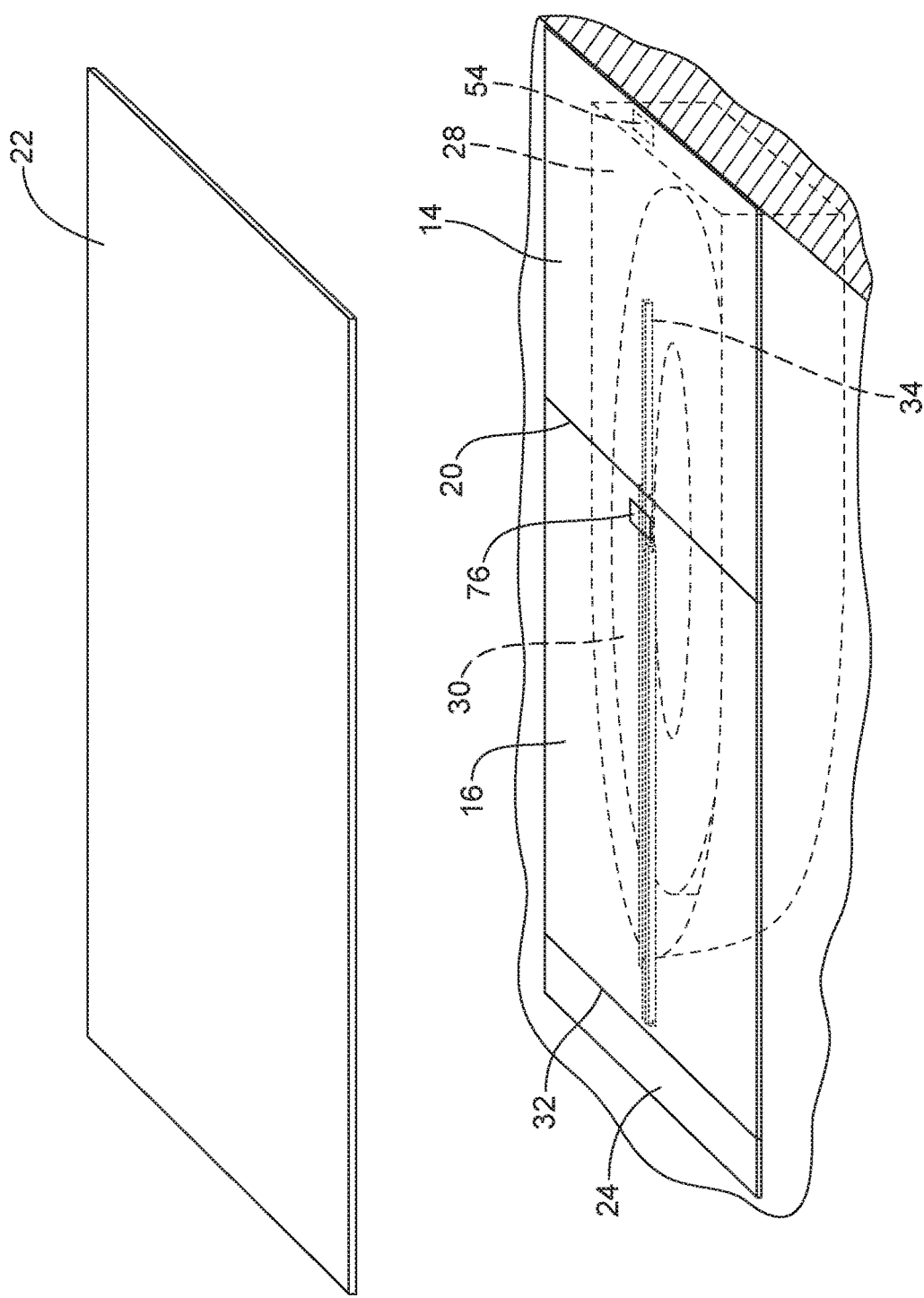
FIG. 2 is a perspective view illustrating the assembled motor vehicle floor assembly in the first or closed position. The decorative cover is exploded from the panels of the articulating floor body for clarity.

As should be appreciated from viewing FIG. 2, when the motor vehicle floor assembly 10 is displaced into the first position for concealing the storage well 28, the second link 36 and third link 40 lie flat between the articulating floor body 12 and the support structure 26 across the top of the storage well 28 with the second and third links extending along opposite sides of the fourth link 44. In contrast, when the motor vehicle floor assembly 10 is in the second or raised position illustrated in FIG. 3, the second link 36 and third link 40 extend upwardly from the fourth link 44 of the support structure 26 holding and supporting the articulating floor body 12 in the desired position to allow access to the storage well 28. A latch mechanism 50 may be provided to secure the articulating floor body 12 in the first position and the second position. The latch mechanism 50 may be magnetic based an include a first magnet 52 in the first panel 14, a second magnet 54 carried on and secured to the support structure 26 and a third magnet 56 secured to the bottom of the rear window tray 58. When the articulating floor body 12 is in the first, closed position the first magnet 52 and the first panel 14 is drawn toward the second magnet 54 carried on or secured to the support structure 26 thereby functioning to releasably hold or latch the motor vehicle floor assembly 10 in the closed position. In contrast, when the articulating floor body 12 is in the second, raised or open position, the first magnet 52 in the first panel 14 is attracted to the third magnet 56 on the rear window tray 58 with sufficient force of attraction to hold the articulating floor body 12 in the open position. In an alternative embodiment, the latch mechanism 50 comprises a hook and loop fastener including a loop body 52 substituted for the first magnet on the first panel 14, a first cooperating hook body substituted for the second magnet 54 on the support structure 26 and a second cooperating hook body substituted for the third magnet 56 on the rear window tray 58.

Figure 3:
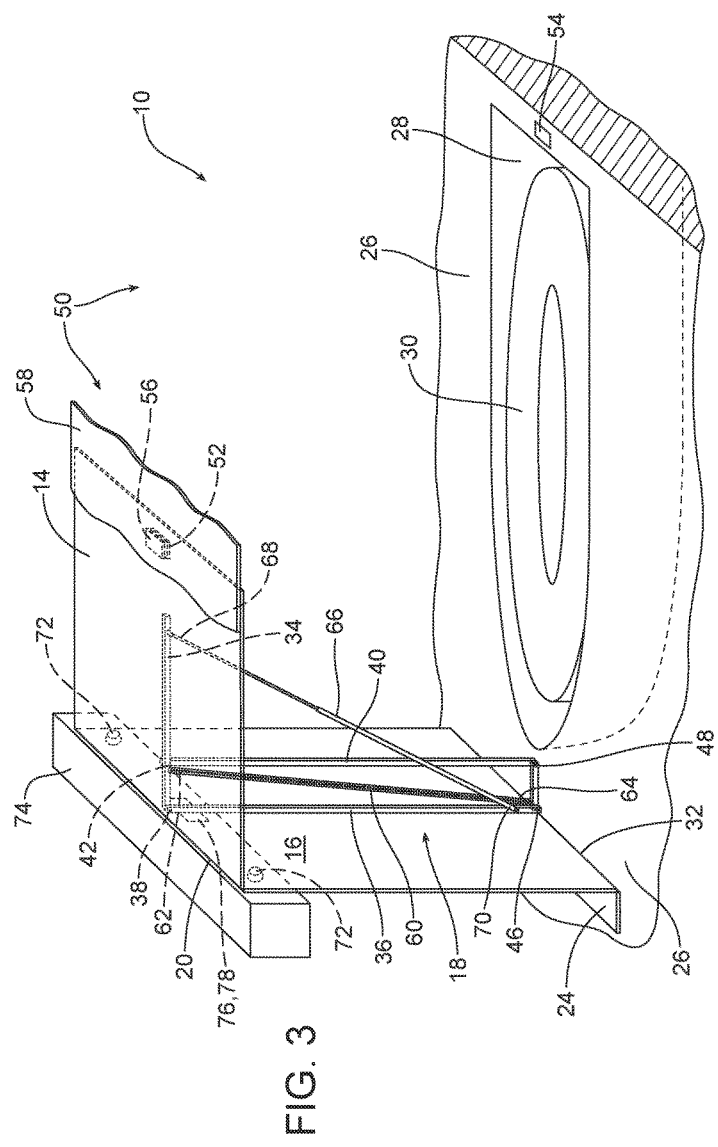
FIG. 3 is a perspective view illustrating the motor vehicle floor assembly in the second or open position allowing access to the spare wheel and tire assembly held in the storage well that is concealed by the motor vehicle floor assembly when in the first or closed position illustrated in FIG. 2.
Figure 4B:
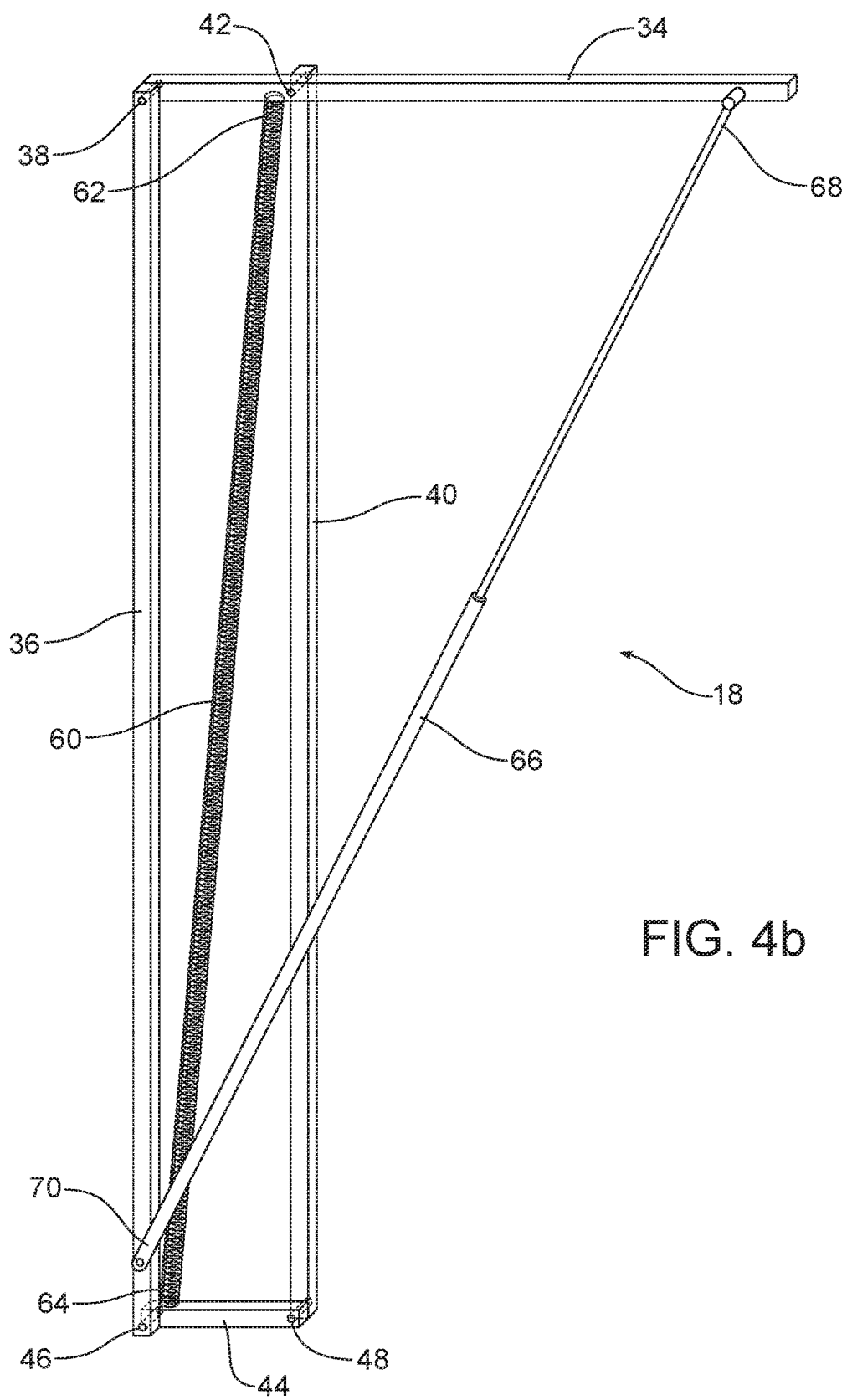

As best illustrated in FIGS. 1 and 2, the motor vehicle floor assembly 10 may also include a spring 60 for biasing the articulating floor body 12 toward the second, raised or open position illustrated in FIG. 3. In the illustrated embodiment, the spring 60 is a linear spring having a first end 62 connected to the first link 34 and a second end 64 connected to the fourth link 44 of the support structure 26. Such a spring 60 may provide sufficient tension to counterbalance some or virtually all of the weight of the articulating floor body 12 thereby allowing one to displace the articulating floor body 12 from the first or closed position to the second or open position with minimal effort. A dampening strut 66 may also be provided to smooth and stabilize the articulating floor body 12 as it is displaced between the first and second positions. That dampening strut 66 may have a first end 68 connected to the first link 34 and a second end 70 connected to the second link 36 of the support structure 26.

In summary, the motor vehicle floor assembly 10 provides a number of benefits and advantages. The motor vehicle floor assembly 10 is easy to utilize and allows one to conveniently and efficiently raise the articulating floor body 12 from the first or closed position illustrated in FIG. 2 to the second, raised or open position illustrated in FIG. 3 in order to gain access to the storage well 28 and the contents contained therein including, for example, the spare wheel and tire 30. The motor vehicle floor assembly 10 may be equipped with a spring 60 providing sufficient force to counterbalance the weight of the articulating floor body 12 and the supporting four bar linkage 18 to thereby allow one to easily displace the articulating floor body into the second or open position. Alternatively, the biasing force provided by the spring 60 may be increased further to allow for automatic raising and opening of the articulating floor body 12 if desired. In such an embodiment, when one releases the latch mechanism 50 (which may be of the push-push type), the spring 60 functions to raise the articulating floor body 12 to the second, raised or open position. Bumper stops 72, on the cross beam support 74, may be provided to engage and stop the articulating floor body 12 in the desired position while preventing it from banging against the other components of the motor vehicle.

The foregoing has been presented for purposes of illustration and description. It is not intended to be exhaustive or to limit the embodiments to the precise form disclosed. Obvious modifications and variations are possible in light of the above teachings. For example, the motor vehicle floor assembly 10 could include cooperating magnets 76, 78 on the respective second panel 16 and cross beam 74 to help secure the floor assembly in the raised position. All such modifications and variations are within the scope of the appended claims when interpreted in accordance with the breadth to which they are fairly, legally and equitably entitled.

What is claimed:

1. A motor vehicle floor assembly, comprising:
   an articulating floor body having a first panel and a second panel supported by a four bar linkage, said articulating floor body being displaceable between a first position and a second position.

2. The motor vehicle floor assembly of claim 1, further including a carpet layer overlying said first panel and said second panel.

3. The motor vehicle floor assembly of claim 2, further including a storage well wherein said articulating floor body conceals said storage well in said first position and allows access to said storage well in said second position.

4. A motor vehicle floor assembly, comprising:
   an articulating floor body having a first panel and a second panel supported by a linkage, said linkage including a first link connected to said first panel, a second link connected to said second panel and a first pivot connecting said first link to said second link and defining an articulation joint for said articulating floor body.

5. The motor vehicle floor assembly of claim 4, further including a third link connected to said first link at a second pivot.

6. The motor vehicle floor assembly of claim 5, wherein said second link is parallel to said third link.

7. The motor vehicle floor assembly of claim 6, further including a third pivot connecting said second link to a support structure.

8. The motor vehicle floor assembly of claim 7, further including a fourth pivot connecting said third link to said support structure.

9. The motor vehicle floor assembly of claim 8, further including a latch mechanism releasably securing said articulating floor body in a first position and a second position.

10. The motor vehicle floor assembly of claim 9, wherein said latch mechanism is magnetic.

11. The motor vehicle floor assembly of claim 9, wherein said latch mechanism includes a first magnet to secure said articulating floor body in said first position and a second magnet to secure said articulating floor body in said second position.

12. The motor vehicle floor assembly of claim 9 wherein said latch mechanism includes a hook and loop fastener.

13. The motor vehicle floor assembly of claim 9, further including a spring biasing said articulating floor body toward said second position.

14. The motor vehicle floor assembly of claim 13, wherein said spring is a linear spring having a first end connected to said first link and a second end connected to said support structure.

15. The motor vehicle floor assembly of claim 14, further including a bumper stop engaging said articulating floor body in said second position.

16. The motor vehicle floor assembly of claim 14, further including a dampening strut having a first end connected to said first link and a second end connected to said support structure.

17. The motor vehicle floor assembly of claim 16, further including a storage well in said support structure.

18. The motor vehicle floor assembly of claim 17, wherein said articulating floor body covers and conceals said storage well in a first position and allows access to said storage well in a second position.

19. The motor vehicle floor assembly of claim 18, further including a carpet layer overlying said first panel and said second panel.

20. The motor vehicle floor assembly of claim 19, further including a stationary floor panel covered by said carpet layer.

\* \* \* \* \*